(12) United States Patent
Liu

(10) Patent No.: US 9,281,720 B2
(45) Date of Patent: Mar. 8, 2016

(54) INDUCTIVE POWER TRANSFER USING A RELAY COIL

(71) Applicant: ConvenientPower HK Ltd., Hong Kong (CN)

(72) Inventor: Xun Liu, Hong Kong (CN)

(73) Assignee: ConvenientPower HK Ltd., Central (HK)

( * ) Notice: Subject to any disclaimer, the term of this patent is extended or adjusted under 35 U.S.C. 154(b) by 197 days.

(21) Appl. No.: 13/907,483

(22) Filed: May 31, 2013

(65) Prior Publication Data

US 2014/0354220 A1    Dec. 4, 2014

(51) Int. Cl.
*H02J 7/00* (2006.01)
*H02J 17/00* (2006.01)
*H02J 5/00* (2006.01)

(52) U.S. Cl.
CPC *H02J 17/00* (2013.01); *H02J 5/005* (2013.01)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| 2010/0127660 A1* | 5/2010 | Cook et al. ..................... 320/108 |
| 2010/0237709 A1* | 9/2010 | Hall et al. ...................... 307/104 |
| 2011/0316334 A1* | 12/2011 | Shimokawa ................. 307/10.1 |
| 2012/0032632 A1* | 2/2012 | Soar ............................. 320/108 |
| 2012/0062175 A1* | 3/2012 | Miller et al. ................... 320/108 |

* cited by examiner

*Primary Examiner* — Arun Williams
(74) *Attorney, Agent, or Firm* — Fenwick & West LLP

(57) ABSTRACT

A wireless power charging system includes an intermediate relay coil. In one aspect, a wireless power charging system is designed to charge a separate device having a receiver that includes a receiver coil. The separate device conforms to a specification for the wireless power charging system, which may be a public standard for wireless power charging systems. The wireless power charging system includes a transmitter and a relay coil resonator. The transmitter includes a driver coil that is driven by a power source. The relay coil resonator includes a relay coil that is used to inductively couple power from the driver coil to the receiver coil. The wireless power charging system is designed so that it satisfies Eqn. (11) above.

14 Claims, 6 Drawing Sheets

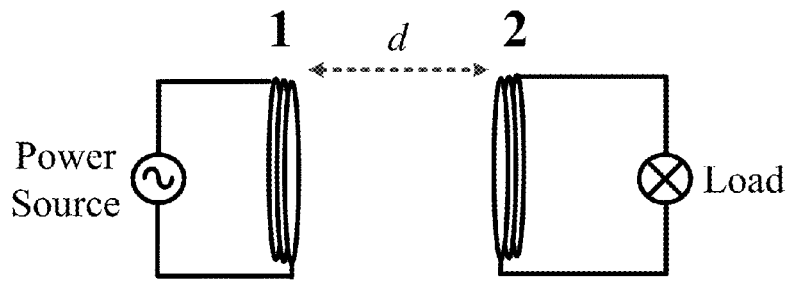
Fig. 1a
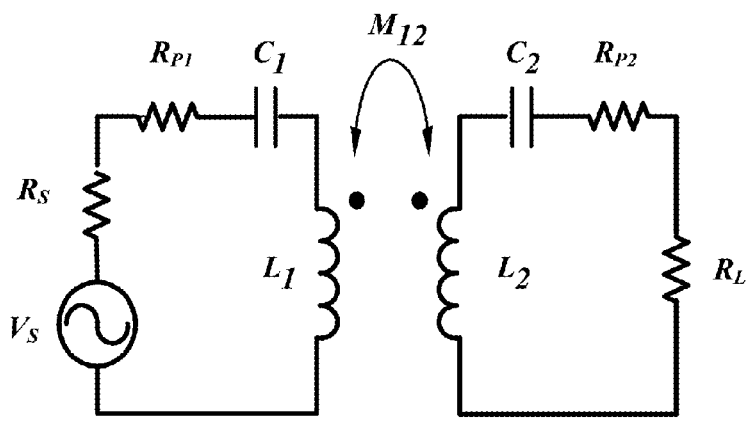
Fig. 1b
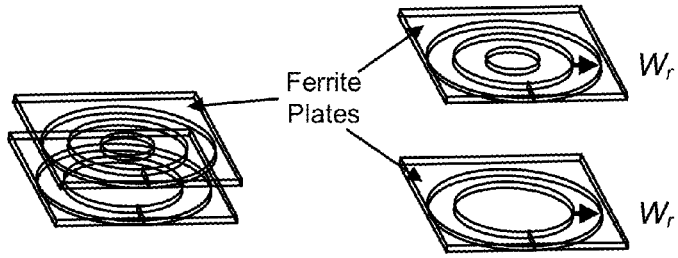 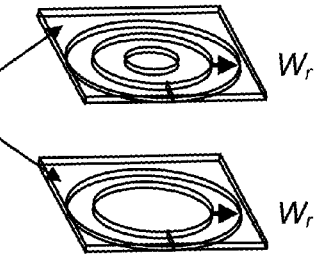
Fig. 2a　　Fig. 2b
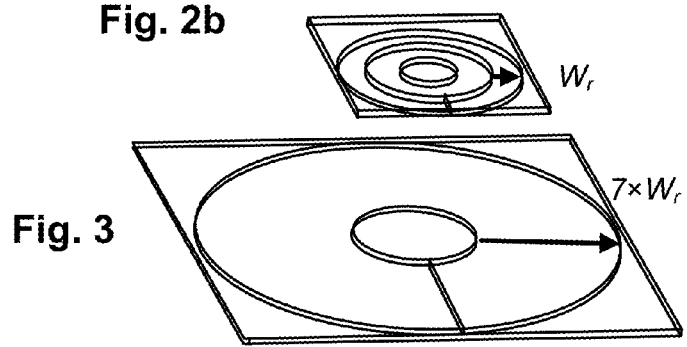
Fig. 3

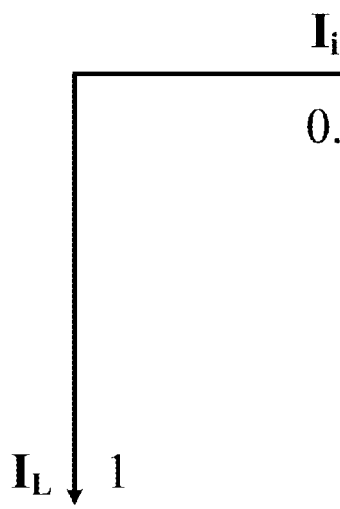
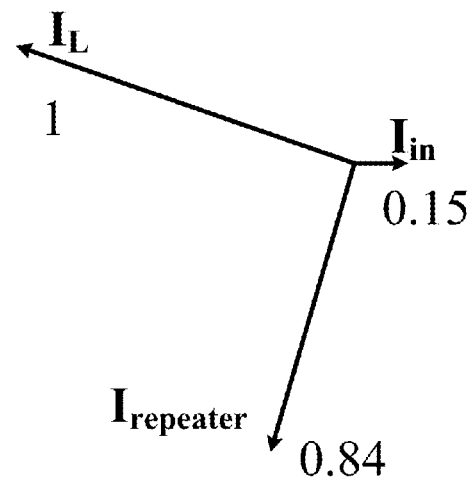
Fig. 12a                    Fig. 12b
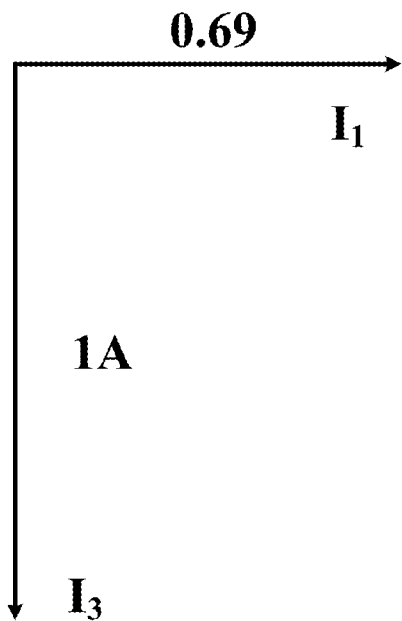
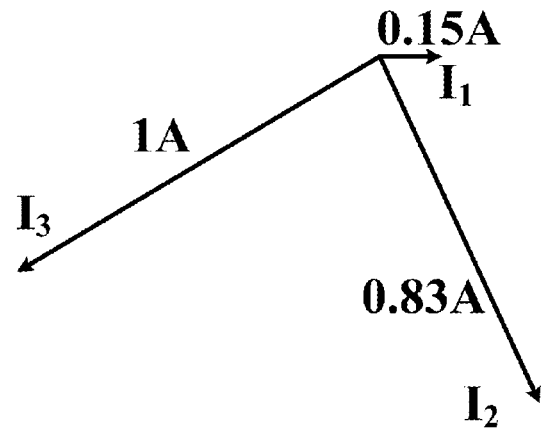
Fig. 13a                    Fig. 13b

INDUCTIVE POWER TRANSFER USING A RELAY COIL

BACKGROUND

1. Field of the Invention

This invention is related to inductive power transfer, and more specifically to inductive power transfer using a relay coil.

2. Description of the Related Art

Wireless (i.e., inductive) power transfer has drawn renewed interest recently, particularly in the wireless charging of portable electronics products. The formation of the wireless power consortium which promotes the wireless power standard Qi has sped up the research and development of wireless power transfer technology. However, in the Qi standard version 1.1, the distance or gap between the surface of a wireless charging pad (or literally the transmitter coil) and the receiver coil of the load is typically limited to 5 mm. As more varieties of wireless charging systems will certainly appear, it is envisaged that some new wireless charging systems may benefit from a larger or extended gap between the transmitter coil and the receiver coil. For example, the transmitter coil may be installed under an office desk or a coffee/kitchen table while the portable electronic devices will be placed on the top surface of the desk or table, so the thickness of the desk or table will be included in the gap between the transmitter and receiver coils.

For wireless power transfer with an extended transmission distance, the conventional 2-coil system (i.e., one transmitter coil and one receiver coil separated by the transmission gap) loses efficiency quickly as the gap increases. Some systems are based on the maximum power transfer principle (i.e., based on impedance matching). However, it has been mathematically proven that, although the maximum power transfer principle can extend the transmission distance, it does so at the expense of energy efficiency. Any wireless power system based on impedance matching or the maximum power transfer theorem cannot achieve energy efficiency higher than 50%. Other systems are based on the maximum energy efficiency principle. The maximum energy efficiency principle is a better approach than the maximum power transfer principle because the overall energy efficiency can exceed 50%. However, as previously mentioned, even if the maximum energy efficiency approach is adopted in a conventional 2-coil system, the energy efficiency will drop exponentially with transmission distance. The use of systems with three or more coils has been proposed. However, there is an incomplete understanding of these types of systems.

Therefore, there is a need for improved approaches to wireless power transfer, especially for approaches that can efficiently transfer power across an extended transmission distance.

SUMMARY

The present invention overcomes the limitations of the prior art by providing a wireless power charging system that includes an intermediate relay coil.

In one aspect, a wireless power charging system is designed to charge a separate device having a receiver that includes a receiver coil. The separate device conforms to a specification for the wireless power charging system, which may be a public standard for wireless power charging systems. The wireless power charging system includes a transmitter and a relay coil resonator. The transmitter includes a driver coil that is driven by a power source. The relay coil resonator includes a relay coil that is used to inductively couple power from the driver coil to the receiver coil. The wireless power charging system is designed so that it satisfies Eqn. (11) below.

Compared to conventional designs without an intermediate relay coil, designs of this type can have larger transmission distances between the charging system and the charged device, higher overall system energy efficiency and/or lower current stress and component current ratings. For example, designs of this type can support transmission distances of greater than 3 cm.

Different geometries are possible. For example, the driver coil and the relay coil can be coplanar. In a coplanar geometry, the driver coil can be positioned inside the relay coil, or vice versa. In a non-coplanar geometry, the relay coil preferably is positioned between the driver coil and the receiver coil.

Possible applications include charging stations and charging electric vehicles, for example.

Other aspects of the invention include methods, devices, components, systems and applications related to the above and its variations.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1a (prior art) is a diagram of a conventional 2-coil wireless power transfer system, and FIG. 1b (prior art) is a lumped circuit model of the system shown in FIG. 1a.

FIGS. 2a and 2b illustrate a wireless power transfer system, where the distance from transmitter coil to receiver coil has been increased.

FIG. 3 illustrates a wireless power transfer system, where the diameter of the transmitter coil has been increased.

FIG. 4b is a lumped circuit model of the system shown in FIG. 4a.

FIGS. 12a-b show current vectors for the 2-coil and 3-coil systems, respectively, with a source resistance of 50 Ω.

FIGS. 13a-b show current vectors for the 2-coil and 3-coil systems, respectively, with a source resistance of 5 Ω.

Figure 4A:
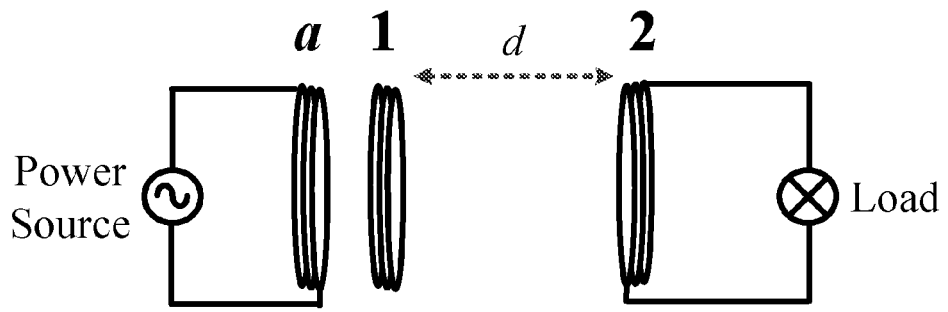
FIG. 4a is a diagram of a 3-coil wireless power transfer system.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures and the following description relate to preferred embodiments by way of illustration only. It should be Analysis Conventional 2-Coil Wireless Power System.

FIG. 1a shows the arrangement of a traditional 2-coil wireless power transfer system. In practice, each coil is connected with a capacitor to form a resonant tank. The use of a capacitor is to compensate the stray inductance of the transmitter and receiver coils. It has been shown in that the overall system energy efficiency of such 2-coil system will reduce drastically as the transmission distance (d) increases. Therefore, for a wireless power system (such as wireless charging pad) with an extended transmission distance (e.g. 30 mm in many cases), the conventional 2-coil system will not enjoy high system efficiency.

As shown in FIG. 1b, a 2-resonator system can be represented as a lumped circuit model and its circuit equations can be expressed as $$(R_1+jX_1)I_1+j\omega M_{12}I_2=V_S \quad (1)$$

$$j\omega M_{12}I_1+(R_2+jX_2)I_2=0 \quad (2)$$

where:
- $R_1=R_S+R_{P1}$ is the resistance of the transmitter; $R_S$ is the source resistance and $R_{P1}$ is the parasitic resistance of the transmitter (e.g., sum of the equivalent series resistance of coil L1 and the equivalent series resistance of capacitor C1);
- $R_2=R_L+R_{P2}$ is the resistance of the receiver; $R_L$ is the load resistance and $R_{P2}$ is the parasitic resistance of the receiver coil L2;
- $X_i$ is the reactance $\omega L_i - 1/(\omega C_i)$, $L_i$ is the inductance, $C_i$ is the capacitance, and $I_i$ is the current in resonator-i (where i=1, 2), respectively;
- $V_S$ is the voltage source;
- $M_{12}$ is the mutual inductance between the two resonators; and
- $\omega$ is the angular frequency of operation.

Bold letters are used to represent the phasors and italic letters are used to represent real numbers and RMS values of the phasors. For example $\mathbf{I}_1$ is a current phasor and $I_1$ is the RMS value of $\mathbf{I}_1$.

Tesla has demonstrated that the coil resonators should operate in resonance mode in order to maximize the power transfer capability of this system. Under the resonance mode, $X_1=X_2=0$. Thus, the overall energy efficiency of the 2-coil system can be expressed as $$\eta=\eta_1\eta_2 \quad (3)$$

where $$\eta_1 = \frac{R_{E1}}{R_S + R_{P1} + R_{E1}} \quad (4)$$

is the energy efficiency of the transmitter while $$R_{E1} = \frac{\omega^2 M_{12}^2}{R_2}$$

is the reflected resistance from the receiver to the transmitter;

$$\eta_2 = \frac{R_L}{R_L + R_{P2}} \quad (5)$$

is the energy efficiency of the receiver.

In practice, the load resistance $R_L$ is within a certain range and is load dependent. So $\eta_2$ is load dependent and may not be directly under the control of the designer. However, the transmitter can be designed to maximize $\eta_1$. In order to boost $\eta_1$, $R_S$ and $R_{P1}$ should be as small as possible and $R_{E1}$ should be large. A large $R_{E1}$ implies that $M_{12}$ should be large for a given operating frequency and a given $R_2$.

If the distance between the transmitter and the receiver increases as shown in FIGS. 2a-2b, $M_{12}$ will decrease accordingly and thereby the efficiency of the system will drop. In order to raise the efficiency for a larger power transfer distance, $M_{12}$ should be increased. Since $M_{12}=k_{12}L_1L_2$ and the receiver coil dimension is usually fixed in a wireless charging standard for a certain product design, $k_{12}$ and $L_1$ should be increased to obtain a larger $M_{12}$.

One way to increase the coupling coefficient and the self-inductance is to increase the diameter of the transmitter as shown in FIG. 3, and as will be discussed in further detail below. On the other hand, if the source resistance $R_S$ is large compared with $R_{E1}$, the efficiency of the transmitter as expressed in Eqn. (4) will be low. The reason is that if the large $R_S$ is considered as part of the resistance in the transmitter, then the quality factor of the transmitter is drawn down significantly. It has been shown that a high quality factor of the coils is an important factor to achieve high power transfer efficiency. Therefore, a conventional system using two resonators is not suitable for high-efficiency power transfer when the source resistance is significant.

3-Coil Wireless Power System.

Figure 4B:
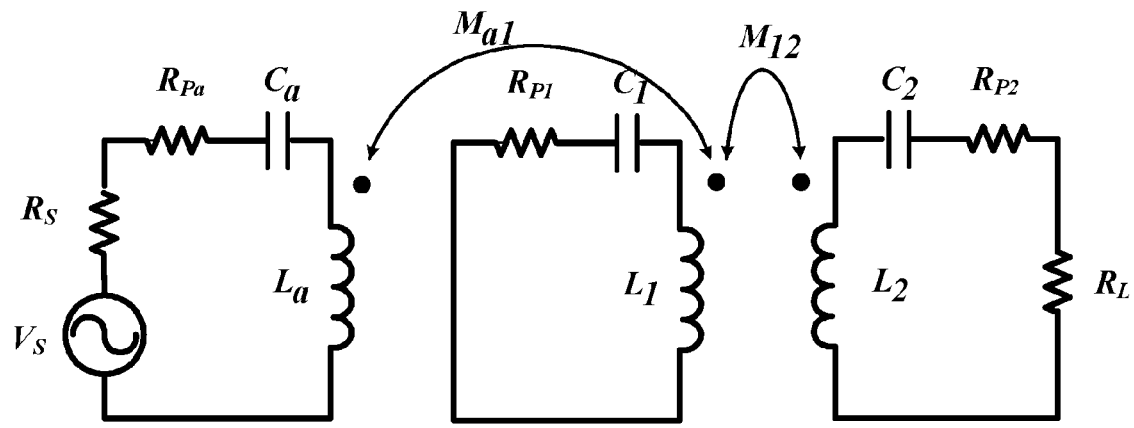

FIG. 4a is a diagram of a 3-coil wireless power transfer system. This system adds an additional resonator at the transmitter side. FIG. 4b is a lumped circuit model of the system shown in FIG. 4a. The system with three resonators can overcome the poor energy efficiency problem for applications with extended transmission distance. The efficiency of the 3-coil system can be higher than the efficiency of the 2-coil system.

As shown in FIG. 4, an additional coil coil-a is added to the transmitter side of the original 2-coil system. Now coil-1 becomes a relay or a repeater resonator. It should be noted that coil-1 includes a winding connected in series with a resonant capacitor to form a coil-resonator. For simplicity and also practically reasonable, the magnetic coupling between coil-a and the receiver coil-2 can be negligibly small compared with the effect of the coupling between coil-1 and coil-2. Assuming that the resonators operate at the resonant frequency ($X_a=X_1=X_2=0$), the lumped circuit equations of the system are $$(R_S+R_{Pa})I_a+j\omega M_{a1}I_1=V_S \quad (6)$$

$$j\omega M_{a1}I_a+R_{P1}I_1+j\omega M_{12}I_2=0 \quad (7)$$

$$j\omega M_{12}I_1+R_2I_2=0 \quad (8)$$

where $R_{Pa}$ is the winding resistance of the driver coil-a and $M_{a1}$ is the mutual inductance between driver coil-a and relay coil-1.

The overall energy efficiency of the 3-coil system is $$\eta'=\eta_a\eta'_1\eta_2 \quad (9)$$

where $$\eta_a = \frac{R_{Ea}}{R_S + R_{Pa} + R_{Ea}}$$

is the efficiency of driver coil-a;

$$R_{Ea} = \frac{\omega^2 M_{a1}^2}{R_{P1} + R_{E1}}$$

is the reflected resistance from relay coil-1 to driver coil-a;

$$R_{E1} = \frac{\omega^2 M_{12}^2}{R_2}$$

is the reflected resistance from the receiver coil-2 to relay coil-1; and $$\eta_1' = \frac{R_{E1}}{R_{P1} + R_{E1}}$$

and $$\eta_2 = \frac{R_L}{R_L + R_{P2}}$$

are the efficiencies of coil-1 and coil-2, respectively.

For the energy efficiency of the 3-coil system to be higher than that of the 2-coil system, the following inequality should be met:

$$\eta' > \eta \quad (10)$$

After some simple mathematical manipulations, the inequality (10) can be expressed as:

$$\omega M_{a1} > (R_{P1} + R_{E1})\sqrt{1 + \frac{R_{Pa}}{R_S}} \quad (11)$$

Equations (1)-(11) provide the precise mathematical proof and the inequality (11) specifies the required conditions for the energy efficiency of the 3-coil system to be higher than that of the 2-coil system.

$\eta' > \eta$ is equivalent to $$\omega M_{a1} > (R_{P1} + R_{E1})\sqrt{1 + \frac{R_{Pa}}{R_S}}.$$

It means that as long as $\omega M_{a1}$ is large enough to meet the inequality of (11), the 3-coil system can enjoy higher energy efficiency than a 2-coil system for the same extended transmission distance. The physical meaning behind this efficiency improvement is that the proposed 3-coil system makes use of the magnetic coupling between coil-a (driver coil) and coil-1 (relay coil) so that only a small current is needed in coil-a to induce a large current in coil-1 which in turn generates the required magnetic flux for the power transfer to coil-2 (receiver coil).

The large current in coil-1 does not flow through the source resistance of the power source and thereby a much smaller power loss can be achieved in the driver circuit. In addition, the current ratings and stress of the electronic components in the driver circuit for coil-a can be reduced, leading to reduced costs and potential reliability improvement. These advantageous features are particularly important for high power applications such as wireless charging of electric vehicles. Therefore, the shift of the current stress from the driver coil (and the driver circuit) to the relay coil resonator is a good advantage. This can be achieved by satisfying the inequality (11).

EXAMPLES

The specified operating conditions defined by equation (11) can be implemented in a 3-coil system: namely the driver coil (coil-a), the relay coil-resonator (coil-1) and the receiver coil (coil-2). The relay coil-resonator (coil-1) can be placed between the driver coil-a and the receiver coil-2. If preferred, the relay coil-resonator can also be placed on the same plane as the driver coil-a. The latter co-planar arrangement is now used to illustrate some examples.

Conventional 2-Coil Wireless Power System.

In this example, the transmission distance is set at 30 mm which is much larger than the 5 mm in a typical wireless charging pad specified in the Qi standard version 1.1. As shown in FIG. 3, $W_r$ is used to represent the coil width of the receiver coil. This coil width is defined as the difference of the outer diameter of the coil and the inner hollow radius of the coil. In this example, the transmitter coil is assumed to have the same inner hollow radius as that of the receiver coil. Different coil widths of the transmitter coil are considered, ranging from the same coil width as the receiver coil (i.e. $W_r$) to several times $W_r$. In the following examples, the coil width of the transmitter coil spans a range from $W_r$ to $7W_r$. The following examples also compare 3-coil designs with conventional 2-coil designs.

Figure 5:
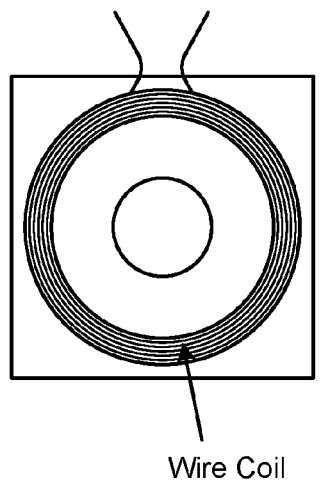
FIG. 5 is an illustration of a receiver coil.

FIG. 5 is an illustration of a receiver coil used in the following examples. Table I lists the parameters of the receiver coil. The receiver coil design is a practical design that could be implemented in real products.

TABLE I

Parameters of receiver coil

| Parameters | Symbol | Value |
| --- | --- | --- |
| Inner diameter | $d_i$ | 21.7 mm |
| Coil width | $W_r$ | 5.32 mm |
| Outer diameter | $d_o$ | 27.02 mm |
| Number of turns per layer | — | 9 |
| Number of layers | — | 2 |

Figure 6:
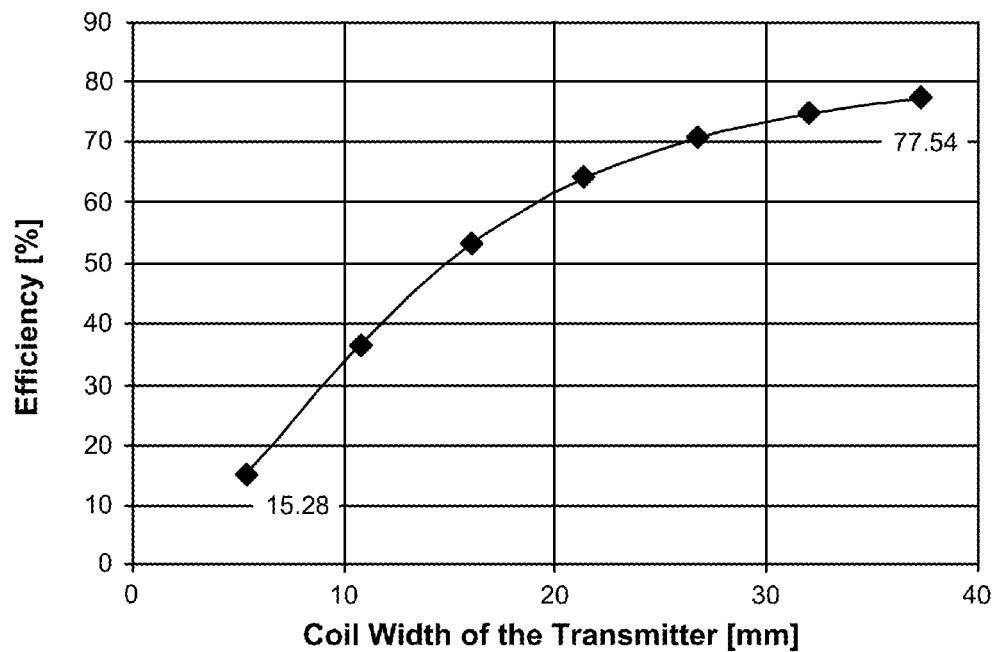
FIG. 6 plots energy efficiency as a function of coil width of the transmitter coil, for a 2-coil system.

FIG. 6 plots energy efficiency as a function of coil width of the transmitter coil for a conventional 2-coil design. In these simulations, the operating frequency is set at 115.6 kHz and the source resistance is assumed zero. As can be seen from FIG. 6, the energy efficiency can be improved significantly by increasing the size of the transmitter coil at this operating frequency. However, there is a diminishing return when the size of the transmitter coil becomes larger. This is because when the coil width of the transmitter is larger than a certain value, the magnetic coupling between the transmitter and the receiver will increase more slowly or even start to decrease.

Figure 7:
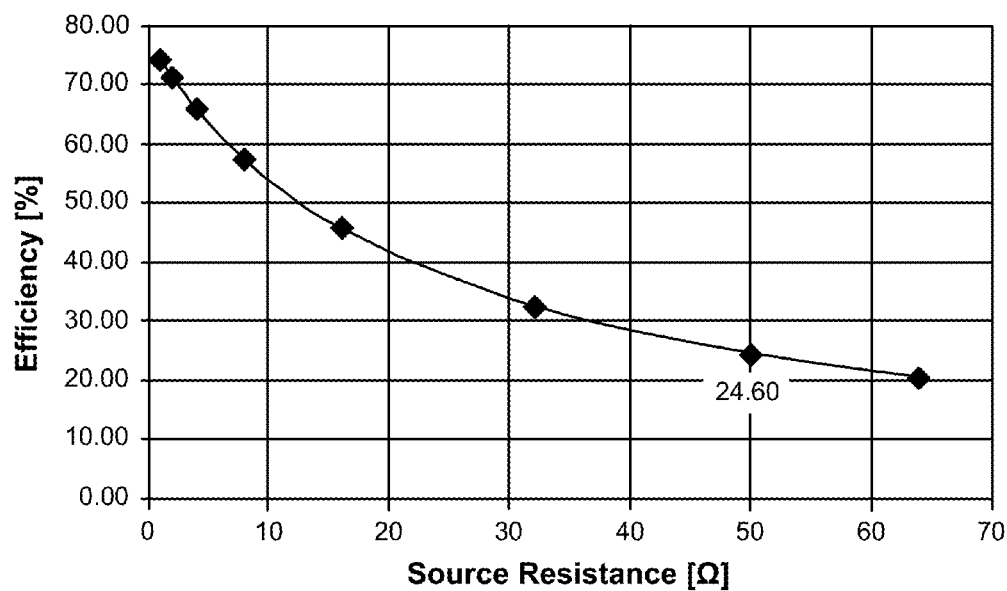
FIG. 7 plots energy efficiency as a function of the source resistance, for a 2-coil system.

In FIG. 6, the source resistance was assumed to be zero, resulting in an energy efficiency of about 77.5% at the maximum coil width simulated=$7W_r$=37.24 mm. However, in a conventional 2-coil system, the energy efficiency of the 2-coil system will decrease with increasing source resistance as shown in FIG. 7. For a source impedance of 2Ω, the efficiency is about 70%. When the source resistance becomes 50Ω, the energy efficiency of the system is only 24.6%. A good industrial practice is to design a power source with a small source impedance. An example of a power source with low source impedance is a power-electronics-based switched mode power supply.

3-Coil Wireless Power System.

Figure 8:
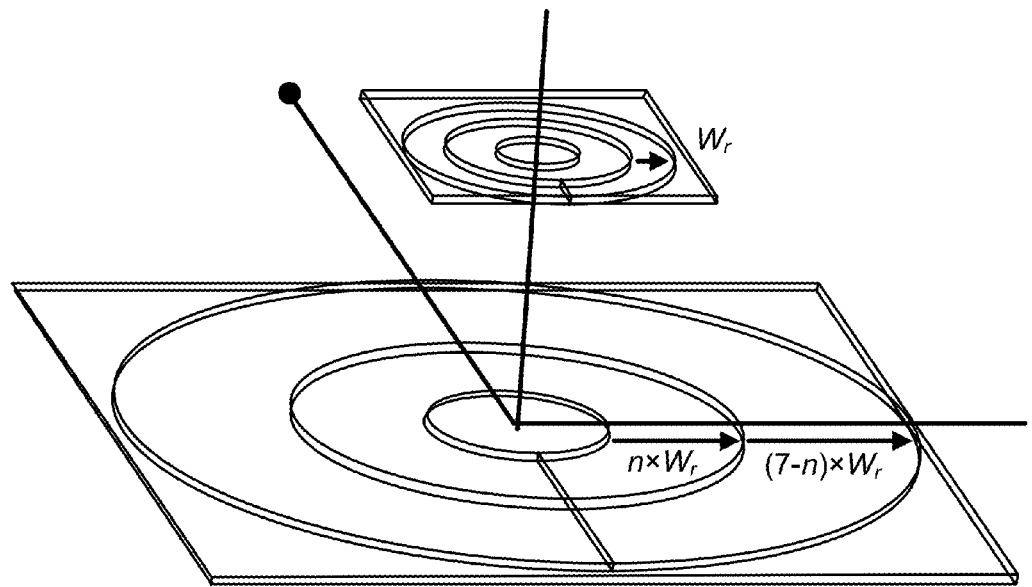
FIG. 8 is a diagram shown a 3-coil model used for simulations.

For comparison purposes, the 2-coil system discussed in FIGS. 5-7 is now transformed into a 3-coil system as shown in FIG. 8. This example is based on the 2-coil system with the largest coil width (i.e., 37.24 mm coil width and 77.5% efficiency at zero source resistance). The single transmitter coil in the 2-coil system (with coil width 37.24 mm) is split into two coils to form a 3-coil system. The two split coils remain in the same plane in this example. However, it should be noted that such coplanar arrangement is not required. The three coils can be placed in a co-axial manner with the relay coil between the driver coil and the receiving coil, such as the arrangement shown in FIG. 4.

In the example of FIG. 8, the driver and the relay coils are located at the transmitter side. The driver coil is connected to the power source while the relay coil operates as a repeater. In order to determine the optimum arrangements of these two coils, the original transmitter with a coil width of 7W, is divided into two coils. The coil widths of the inner coil and the outer coil are n×$W_r$ and (7−n)×$W_r$, respectively, where n ranges from 0 to 7. If the inner coil is used as the driver coil, then the outer coil will be used as the relay coil, and vice versa. In principle, using the outer coil as the driver coil-a and the inner coil as the relay coil-1 may achieve a slightly better mutual inductance $M_{a1}$ for inequality (11). However, it should be noted that either arrangement is viable as long as the inequality (11) is satisfied. For the relay coil, a series capacitor is connected in series with the coil to form a coil-resonator.

Figure 9:
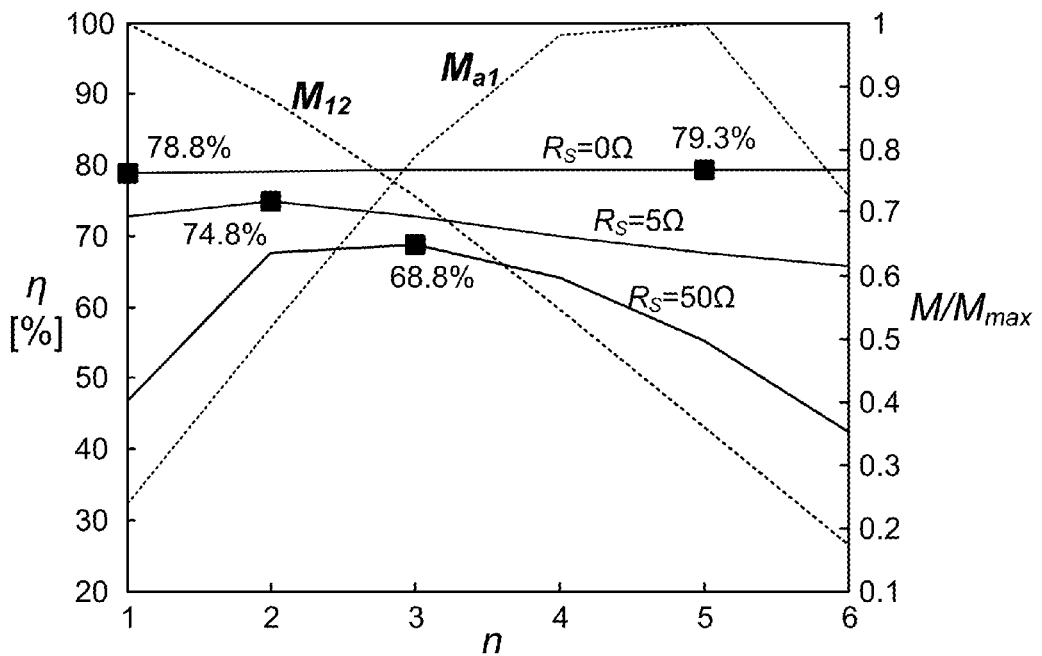
FIG. 9 plots mutual inductance ($M_{a1}$ and $M_{12}$) and energy efficiency as a function of coil widths, when the inner coil is excited as the driver coil.
Figure 10:
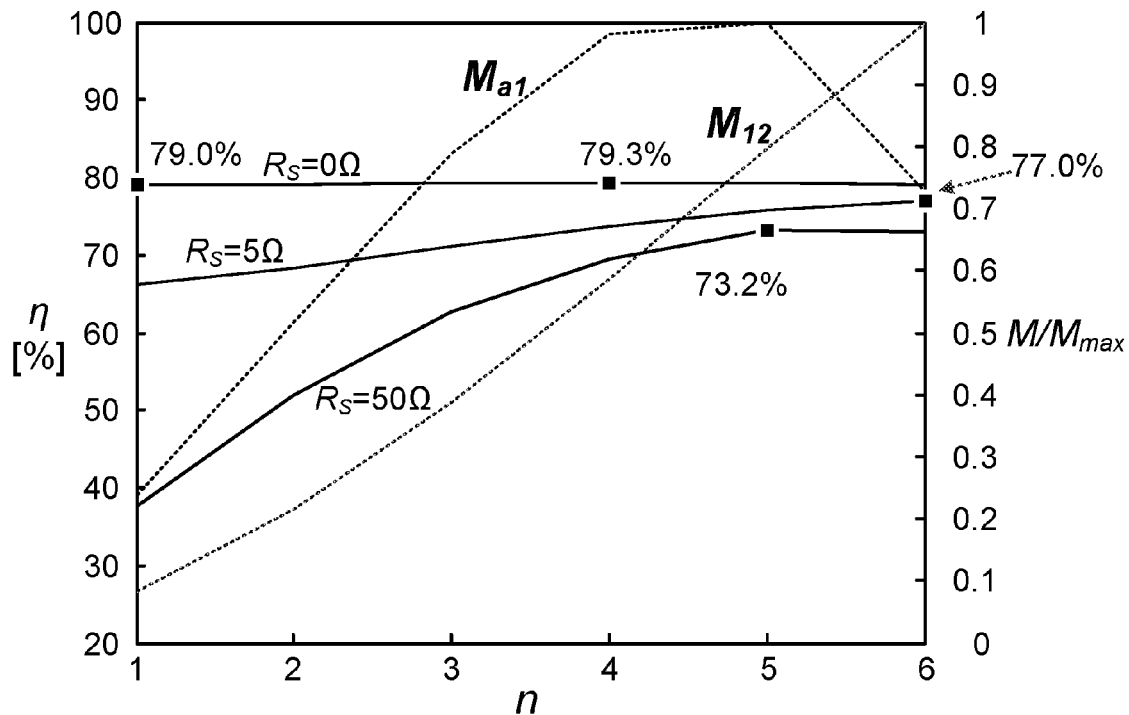
FIG. 10 plots mutual inductance ($M_{a1}$ and $M_{12}$) and energy efficiency as a function of coil widths, when the outer coil is excited as the driver coil.

FIG. 9 plots mutual inductance ($M_{a1}$ and $M_{12}$) and energy efficiency as a function of coil widths, when the inner coil is excited as the driver coil. FIG. 10 plots the same quantities, but when the outer coil is excited as the driver coil. Consider FIG. 9 in more detail. The independent variable n defines the coil widths of the inner and outer coils. When n=1, the inner coil has coil width $W_r$ and the outer coil has coil width 6$W_r$ (i.e., thin inner coil and thick outer coil). When n=6, the inner coil has coil width 6$W_r$ and the outer coil has coil width $W_r$ (i.e., thick inner coil and thin outer coil). The curves labeled $M_{a1}$ and $M_{12}$ plot the mutual inductances on a relative scale of 0 to 1. The remaining three curves plot energy efficiency, for source resistances of 0 Ω, 5Ω and 50Ω, respectively. Recall from FIG. 7 that at these same source resistances, the energy efficiency of the 2-coil system is approximately 77.5%, 65% and 25%, respectively.

The set of simulations in FIG. 9 have been conducted with the inner coil connected to the power source (as driver coil-a) and the outer coil connected in series with a capacitor to form a relay resonator (relay coil-1). The basic rule is that when the source resistance becomes larger, the importance of a large $M_{a1}$ becomes more obvious. This is because, with a larger $M_{a1}$, a smaller current is required in coil-a in order to generate a large enough current in coil-1 for power transfer to coil-2 according to the previous analysis. However, a large magnetic coupling between the relay resonator and the receiver coil ($M_{12}$) also helps to achieve a high efficiency and this is the reason why the efficiency curve of the system with 50Ω source resistance reaches its peak value at a point which has a relative large $M_{a1}$ and $M_{12}$ at the same time. On the other hand, when the source resistance is negligibly small, the effect of $M_{a1}$ is smaller.

In the set of simulations in FIG. 10, the outer coil is connected to the power source and thereby, the outer coil is driver coil-a and the inner coil (which is now connected in series with a resonant capacitor to form a coil-resonator) is relay coil-1. In this case, the energy efficiency of the 3-coil system with a 50Ω source resistance is much higher than that of FIG. 9. The reason is that $M_{a1}$ and $M_{12}$ in this case increase simultaneously which is different compared to that in the first case as shown in FIG. 9. Therefore, larger magnetic couplings can be obtained for a higher efficiency.

Experimental Verification.

Figure 11:
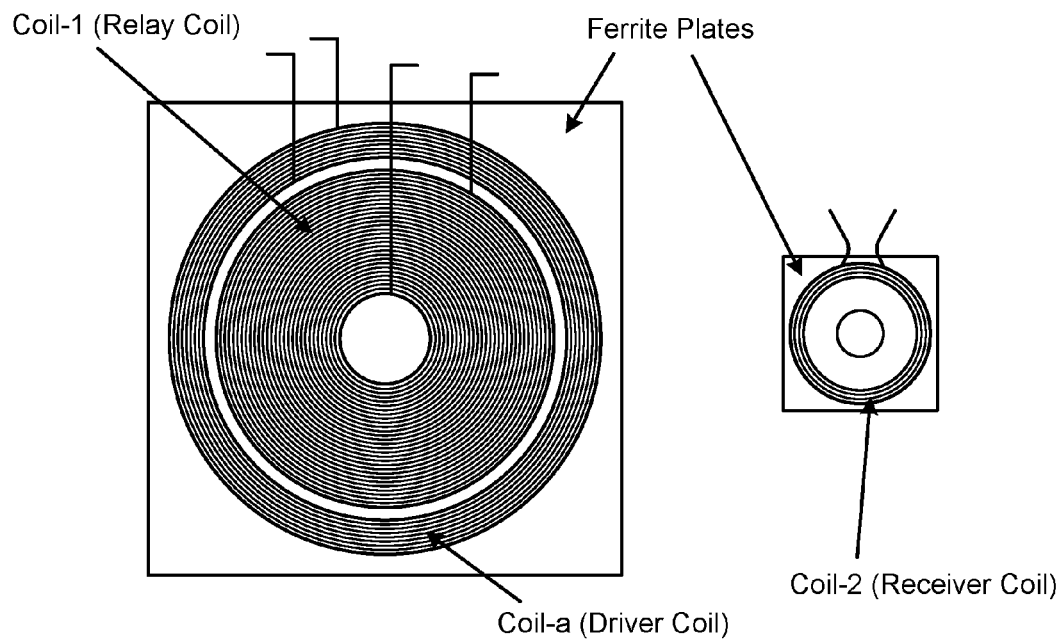
FIG. 11 is an illustration of a 3-coil system used in experiments.

Experiments were carried out using a practical 3-coil system as shown in FIG. 11. In the 3-coil system, the outer coil is used as the driver coil (coil-a) and the inner coil is used as the relay coil (coil-1). The actual size of the inner coil is smaller than the size used in previous simulations. One set of finite element analysis simulations is done according to the practical sizes. The values predicted by simulation are listed in Table II, compared with the values measured with LCR meter ZM2355.

TABLE II

Parameters of the 3-coil system

| | Calculated Parameters | Measured Parameters |
|---|---|---|
| $L_a$ | 114.1 μH | 116.8 μH |
| $R_a$ | 0.97 Ω | 0.92 Ω |
| $L_1$ | 1.050 mH | 1.033 mH |
| $R_1$ | 3.56 Ω | 3.6 Ω |
| $L_2$ | 23.1 μH | 23.8 μH |
| $R_2$ | 0.28 Ω | 0.27 Ω |
| $C_2$ | 82.0 nF | 82.1 nF |
| $M_{a1}$ | 143 μH | 141 μH |
| $M_{12}$ | 14.7 μH | 15.0 μH |
| $M_{a2}$ | 2.87 μH | 2.93 μH |
| $R_{a1}$ | 0.01 Ω | 0.1 Ω |
| $R_S$ | 50 Ω | 49 Ω |
| $R_L$ | 8.75 Ω | 8.93 Ω |

The energy efficiencies of the 3-coil system with a source resistance of 0Ω and of 50Ω were measured. For a source resistance that is between 0Ω and 50Ω, the energy efficiency should fall between the values measured for 0Ω and 50 Ω.

The compensating capacitance of the receiver coil (coil-2) is set at about 82 nF which is also close to the optimum value for an operating frequency of 115.6 kHz in this study. The optimum compensating capacitance of relay coil-1 is 1.70 nF and 1.83 nF for 0 and 50Ω source resistances, respectively. The energy efficiencies of the 3-coil system are compared with the efficiencies of the 2-coil system (in which coil-a and coil-1 in the 3-coil system are connected in series to form a single transmitter coil).

The comparison results are listed in Table III. By using the proposed 3-coil structure and the design criterion of inequality (11), the measured energy efficiency can be as high as 63.5% even with a 50Ω source resistance (while the efficiency is only 24.5% for the 2-coil structure). The energy efficiency errors between the calculated values and the measured values are about 7% for all of the last three cases as listed in Table III. The errors might be due to the errors in measuring the parameters, the losses in ferrite plates, and the losses in the compensating capacitors. The losses in the ferrite and resistance in the capacitors are not included in the analysis.

TABLE III

Calculated and measured efficiencies of the 3-coil system and the 2-coil system

|  |  | Calculated Efficiency using Calculated Parameters | Calculated Efficiency using Measured Parameters | Measured Efficiency |
|---|---|---|---|---|
| Rs = 50 Ω | 2-Coil System | 23.7% | 24.5% | 24.5% |
|  | 3-Coil System | 70.3% | 70.4% | 63.5% |
| Rs ≈ 0 Ω | 2-Coil System | 77.2% | 77.8% | 70.3% |
|  | 3-Coil System | 77.7% | 77.0% | 71.5% |

The currents are also measured and plotted in FIGS. 12a-b for the 2-coil and 3-coil systems with a 50Ω source impedance. The RMS values of the load currents are taken as the reference (i.e. 1.0) for the per-unit representation of the vector diagrams. In FIG. 12a, $I_{in}$ is the current in the transmitter coil and $I_L$ is the current in the receiver coil. In FIG. 12b, $I_{in}$ is the current in the driver coil, $I_{repeater}$ is the current in the relay coil and $I_L$ is the current in the receiver coil. As can be seen, the input current in the 3-coil system is much smaller than that in the 2-coil system. The per-unit current in the driver coil (coil-a) of the 3-coil system is only 0.15, while that of the 2-coil system is 0.65. This means that the current requirement in the 3-coil system is much lower than in the 2-coil system.

If the source impedance is reduced from 50Ω to 5Ω, the vector diagrams of the 2-coil and 3-coil systems are displayed in FIG. 13. The per-unit value of the driver current in the 2-coil system is 0.69, and that in the 3-coil system is only 0.15. This indicates that the use of a 3-coil system (with an intermediate relay) that meets the proposed criterion will reduce the current in the driver circuit of the wireless power transfer system.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A wireless power charging system for charging a separate device having a receiver that includes a receiver coil, the separate device conforming to a specification for the wireless power charging system, the wireless power charging system comprising:
    a transmitter including a driver coil configured to be driven by a power source; and
    a relay coil resonator including a relay coil configured for relaying power by inductive coupling from the driver coil to the receiver coil;
    wherein $$\omega M_{a1} > (R_{P1} + R_{E1})\sqrt{1 + \frac{R_{Pa}}{R_S}}$$

where:
  ω is an angular frequency of operation of the wireless power charging system,
  $M_{a1}$ is a mutual inductance between the driver coil and the relay coil,
  $R_{P1}$ is a parasitic resistance of the relay coil resonator,
  $R_{E1}$ is a reflected resistance from the receiver coil to the relay coil,
  $R_{Pa}$ is a parasitic resistance of the transmitter, and
  $R_S$ is a resistance of the power source.

2. The wireless power charging system of claim 1 wherein a current in the driver coil is less than a current in a transmitter coil of a 2-coil wireless power charging system in which the transmitter coil relays a same amount of power directly to the receiver coil.

3. The wireless power charging system of claim 2 wherein the lower current in the driver coil results in a lower current stress and/or a lower conduction or switching power loss in electronics driving the driver coil, compared to electronics driving the transmitter coil in the 2-coil wireless power charging system.

4. The wireless power charging system of claim 1 wherein the wireless power charging system is capable of charging the separate device at a separation of greater than 3 cm.

5. The wireless power charging system of claim 1 wherein the relay coil is fixed to one side of a support structure and the separate device is placed on a surface of another side of the support structure.

6. The wireless power charging system of claim 1 wherein the relay coil is fixed to a bottom side of a support structure and the separate device is placed on a top surface of the support structure.

7. The wireless power charging system of claim 1 wherein the driver coil and the relay coil are coplanar.

8. The wireless power charging system of claim 7 wherein the driver coil is positioned inside the relay coil.

9. The wireless power charging system of claim 7 wherein the relay coil is positioned inside the driver coil.

10. The wireless power charging system of claim 1 wherein the driver coil and the relay coil are not coplanar, and the relay coil is positioned between the driver coil and the receiver coil.

11. The wireless power charging system of claim 1 wherein the power charging system is part of a permanently-located charging station.

12. The wireless power charging system of claim 1 wherein the power charging system is part of a wireless charging table.

13. The wireless power charging system of claim 1 wherein the power charging system is capable of charging an electric vehicle.

14. The wireless power charging system of claim 1 wherein the specification for the wireless power charging system is a public standard for wireless power charging systems.

* * * * *